United States Patent [19]
Derrien et al.

[11] Patent Number: 4,907,761
[45] Date of Patent: Mar. 13, 1990

[54] MECHANISM FOR CONTROLLING A CATAPULT BAR

[75] Inventors: Michel Derrien, Versailles; Dominique Ducos, Massy; Jean-Luc Engerand, Sceaux, all of France

[73] Assignee: Messier-Hispano-Bugatti, Montrouge, France

[21] Appl. No.: 285,600

[22] Filed: Dec. 16, 1988

[30] Foreign Application Priority Data

Dec. 18, 1987 [FR] France .................. 87 17746

[51] Int. Cl.$^4$ .................................. B64C 25/10
[52] U.S. Cl. .......................... 244/102 R; 244/63
[58] Field of Search ........... 244/50, 63, 100 R, 102 R, 244/102 A; 280/479.3, 491.3, 479.1, 478.1; 180/904

[56] References Cited

U.S. PATENT DOCUMENTS

| 2,997,121 | 8/1961 | Clifton, Sr. et al. ............ 180/904 |
| 3,155,345 | 11/1964 | Paysen . | |
| 3,231,294 | 1/1966 | Horney ...................... 280/479.1 |
| 3,295,866 | 1/1967 | Standfuss .................. 280/479.1 |
| 3,370,811 | 2/1968 | Boody . | |
| 3,647,164 | 7/1972 | Smith . | |
| 3,762,670 | 10/1973 | Chillson ...................... 244/50 |
| 4,401,285 | 8/1983 | Simmonds ..................... 244/63 |
| 4,552,375 | 11/1985 | Kinzenbaw ................ 280/491.3 |

FOREIGN PATENT DOCUMENTS 1376323 9/1964 France .

*Primary Examiner*—Galen Barefoot
*Attorney, Agent, or Firm*—Sixbey, Friedman, Leedom & Ferguson

[57] ABSTRACT

A control mechanism according to the invention comprises a crank (13) constrained to rotate with the catapult bar (10), a catapult bar linkage comprising a link (14) and a lever (16) which are hinged to each other, and having a first end hinged to the crank (13) at a point distant from the pivot pin of the catapult bar, and a second end hinged about a pin (17) carried by the landing gear and distant from the pivot pin (11) of the catapult bar (10), and control means (18) for controlling the relative disposition of the link and the lever.

8 Claims, 2 Drawing Sheets

MECHANISM FOR CONTROLLING A CATAPULT BAR

The present invention relates to a mechanism for controlling a catapult bar for carrier-based aircraft.

BACKGROUND OF THE INVENTION

In order to enable an aircraft to take off from an aircraft carrier it is necessary to catapult the aircraft in order to compensate for the very short take-off run. The catapult generally comprises a slug which projects slightly above the take-off deck and which is driven at high speed during catapulting. The motion of the slug is transmitted to the aircraft by a catapult bar which is generally mounted to pivot about a pin carried by the landing gear between a stand-by position in which the catapult bar is in a substantially horizontal position in order to avoid running the risk of it catching on items on the deck while the aircraft is being maneuvered, and a position in which it is lowered towards the deck when the aircraft is ready to be catapulted in order to allow it to engage the catapult slug. The catapult bar is generally also provided with a completely folded-away position in order to reduce the stowage volume of the landing gear when retracted.

In existing systems, the mechanism for controlling the position of the catapult bar generally comprises a multiplicity of springs whose effects compensate one another to a greater or lesser extent depending on the position of a control member associated with the catapult bar. Such devices are not only complex in structure, and therefore heavy, they also suffer from the risk of the counter-balancing springs breaking due to fatigue resulting from the numerous reciprocating forces to which they are subjected.

An object of the present invention is to propose a mechanism for controlling a catapult bar which is both simple and very safe in operation.

SUMMARY OF THE INVENTION

In order to achieve this object, the present invention provides a control mechanism for controlling a catapult bar mounted to pivot about a pin carried by a landing gear, the mechanism comprising a crank constrained to rotate with the catapult bar, a catapult bar linkage comprising a link and a lever which are hinged to each other, and having a first end hinged to the crank at a point distant from the pivot pin of the catapult bar, and a second end hinged about a pin carried by the landing gear and distant from the pivot pin of the catapult bar, and control means for controlling the relative disposition of the link and the lever.

Thus, the catapult bar is easily positioned in accurate manner by operating the control means.

In an advantageous version of the invention, the control mechanism of the invention includes return means for returning the link and the lever towards an in-line position. Preferably, the return means for returning the link and the lever towards an in-line position comprise a return spring acting on the link or on the lever, and an abutment preventing the catapult bar linkage from moving beyond the in-line position. Thus, in the stand-by position, the catapult bar is held in a constant position corresponding to the link and the lever being in an in-line position regardless of the jolts to which the landing gear is subjected during landing, while running along the take-off deck, or during any other on-deck maneuver.

According to an aspect of the invention, in conjunction with a landing gear including a shock absorber including a strut, a rotary tube mounted to pivot relative to the strut, a rod slidably mounted relative to the rotary tube and to the strut, and a torque linkage having a top arm hinged to the rotary tube and a bottom arm hinged to the rod, the return spring is disposed between one of the arms of the torque linkage and a facing portion of the catapult bar linkage. Preferably, the return spring is connected to the bottom arm of the torque linkage on a portion thereof which extends beyond the hinge point between the two arms of the torque linkage. Thus, when the shock absorber is compressed by the weight of the aircraft on the deck, the link and the lever are held firmly in the in-line position. Further, in the preferred embodiment, the motion of the hinge point between the arms of the torque linkage and the motion of the point where the spring is connected to the bottom arm of the torque linkage are opposite such that the spring remains subjected to substantially constant compression during oscillations of the shock absorber about its point of equilibrium. Consequently, fatigue in the return spring is minimized and in-line locking security is reliably ensured.

In another aspect of the invention, in conjunction with a retractable landing gear, the catapult bar control mechanism includes actuator means for actuating the catapult bar towards a folded-down position while the landing gear is being raised. Preferably, the actuator means comprise an actuator member fixed to a moving component of the landing gear while the catapult bar linkage is carried by another component of the landing gear. Thus, when the landing gear is raised, the relative motion between the two components of the landing gear causes the actuator member to engage with the corresponding portion of the catapult bar linkage and thus causes the catapult bar to be folded down completely.

BRIEF DESCRIPTION OF THE DRAWINGS

An embodiment of the invention is described by way of example with reference to the accompanying drawings, in which.

MORE DETAILED DESCRIPTION

Figure 1:
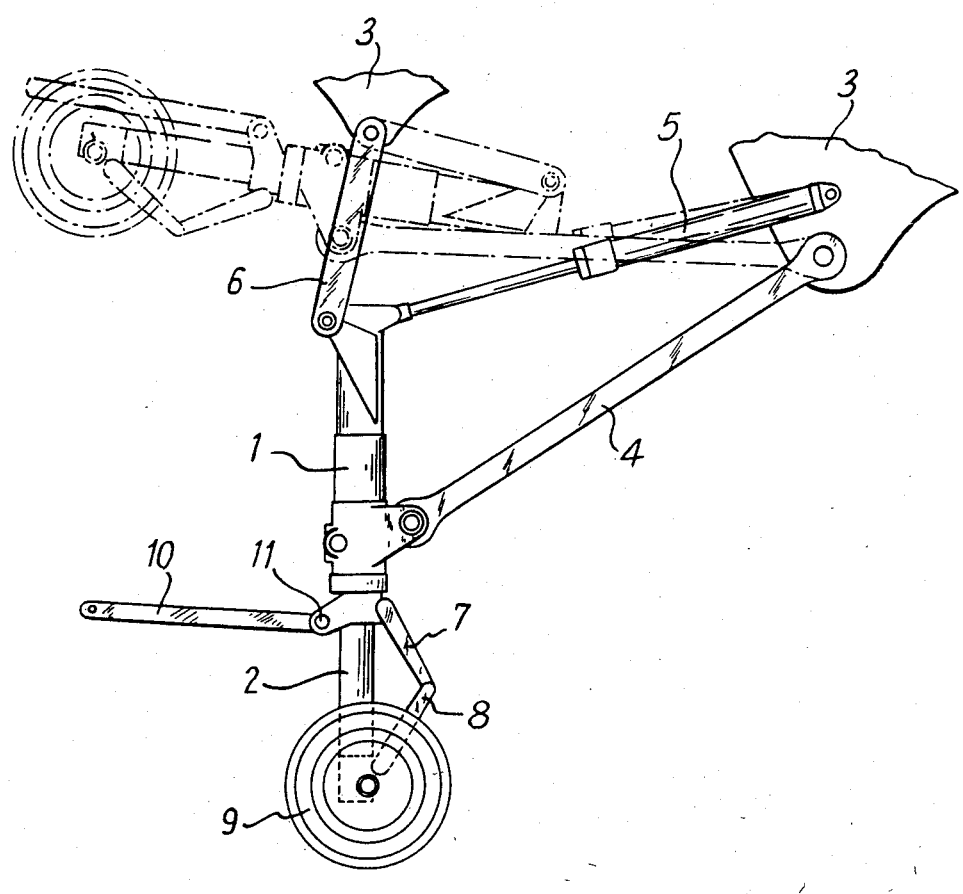
FIG. 1 is a diagrammatic side view of landing gear including a control mechanism in accordance with the invention.

With reference to the figures, the landing gear with which the mechanism of the invention is associated comprises in conventional manner a shock absorber comprising a strut 1 in which a rod 2 is slidably mounted and which is associated with a rotary tube 12. The shock absorber strut 1 is connected to the structure 3 of the aircraft by a brace 4, a raising actuator 5, and a rocker 6. The shock absorber rod 2 is connected to the rotary tube 12 by a torque linkage having a top arm 7 hinged to the rotary tube and a bottom arm 8 hinged to the rod 2. The bottom end of the rod 2 carries a wheel assembly 9.

On deck, the raising actuator 5 is in its extended position and the landing gear is extended as shown in solid lines in FIG. 1. While the landing gear is being raised, the rod of the raising actuator 5 is retracted, thereby pivoting the various components constituting the landing gear towards a substantially horizontal position as shown in dot-dashed lines in FIG. 1.

Aircraft carried by an aircraft carrier are provided with a catapult bar 10 mounted to pivot about a pin 11 carried by the rotary tube 12 associated with the strut 1 of the shock absorber.

In accordance with the invention, the mechanism for controlling the position of the catapult bar 10 comprises a crank 13 constrained to rotate with the catapult bar 10, a catapult bar linkage comprising a link 14 and a lever 16 hinged to each other, with the link 14 having one end hinged to the crank 13 at a hinge point 15 which is at a distance from the pivot pin 11 of the catapult bar, while the lever 16 has one end hinged to the rotary tube 12 about a pin 17 which is also at a distance from the pivot pin 11 of the catapult bar, and control means for controlling the relative disposition of the link 14 and the lever 16, the control means comprising an actuator 18 whose body is hinged to the side of the rotary tube 12 and whose rod is hinged to a control bar 19 constrained to rotate with the lever 16.

The mechanism further includes means for returning the link and the lever towards an in-line position, the means comprising a spring 20 having a bottom end hinged to the bottom arm 8 of the torque linkage on a portion thereof which extends beyond the hinge point 21 between the two arms of the torque linkage, and a top end hinged to the lever 16 at a point thereon which extends beyond the pivot pin 17 of said portion of the catapult bar linkage relative to the point 22 where the link is hinged to the lever. An abutment 23 is carried by the cover 12 and prevents the portions of the catapult bar linkage 14 and 16 from moving beyond the in-line position.

In addition, the mechanism of the invention also comprises actuator means for moving the catapult bar towards a folded-down position, the actuator means comprising a fork 24 which is constrained to rotate with the brace 4 and which includes a long top tine 25 and a short bottom tine 26. When the landing gear is in its lowered position, the end of the fork 24 faces a lug 27 carried by an actuating bar 28 constrained to rotate with the lever 16.

Figure 2:
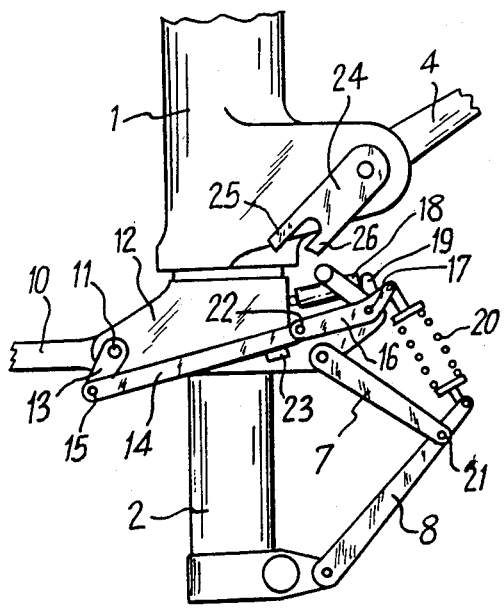
FIG. 2 is a fragmentary diagrammatic side view of the mechanism of the invention when the aircraft is waiting or is maneuvring deck.

The mechanism of the invention operates as follows: while the aircraft is waiting on deck, the landing gear is lowered and the shock absorber is partially compressed because of the weight of the aircraft. The mechanism then takes up the position shown in FIG. 2 in which the control actuator 18 is inactivated and the link 14 is in line with the lever 16 under the effect of the compression spring 20 which presses the link 14 against the abutment 23. When the catapult bar linkage is in this position, the catapult bar 10 is in a substantially horizontal position. While running along the deck, the rod 2 of the shock absorber is caused to oscillate about it equilibrium position corresponding to the static load of the aircraft. During oscillations of the rod 2, the hinge point 21 between the arms of the torque linkage oscillates in corresponding manner, but the bottom arm 8 of the torque linkage to which the bottom end of the compression spring 20 is connected oscillates in the opposite direction to the hinge point 21 and as a result the compression spring 20 oscillates little and is therefore subjected to very little fatigue. Further, because the portions of the catapult bar linkage 14 and 16 are in line, the inertia forces acting on the catapult bar 10 are absorbed by the pivot pins, and the spring 20 is therefore not affected thereby.

Figure 3:
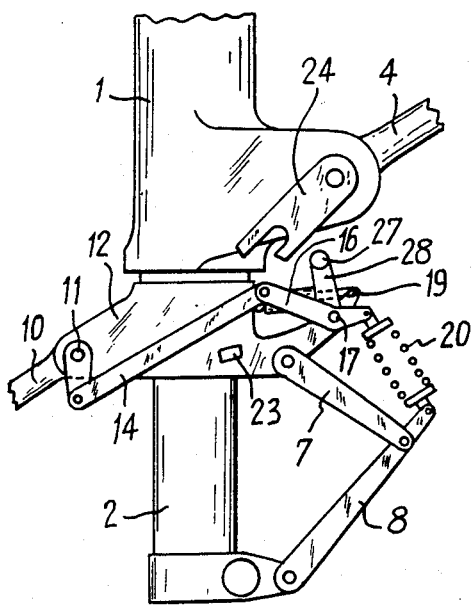
FIG. 3 is a view similar to FIG. 2 with the bar in the catapulting position.

When the aircraft is brought to the catapulting position and it is desired to lower the catapult bar towards the slug, the actuator 18 is controlled to cause its rod to be extended from the actuator as shown in FIG. 3. During this movement, the control bar 19 pivots about the pin 17 and causes the lever 16 to rotate correspondingly, thereby further compressing the return spring 20. The two portions of the catapult bar linkage are then at an angle to each other and the link 14 drives the crank 13 which in turn pivots the catapult bar 10 downwards.

Figure 4:
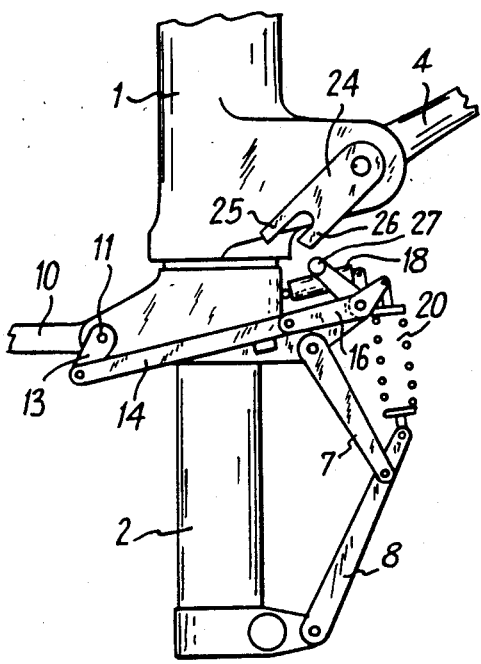
FIG. 4 is a view similar to FIG. 2 when the aircraft has just been catapulted.
Figure 5:
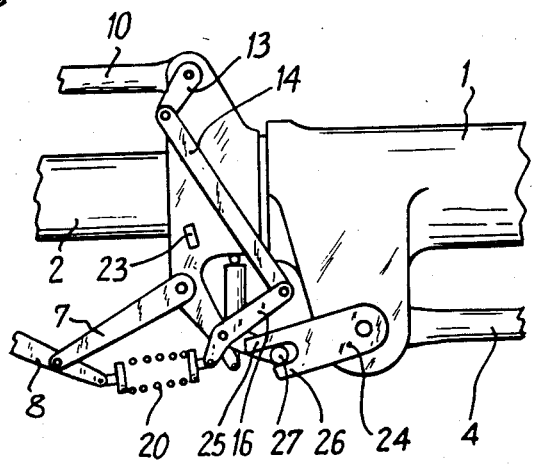
FIG. 5 is a view analogous to FIG. 2 when the landing gear has been raised.

Once the catapult bar has been engaged in the slug, the feed to the actuator 18 is switched off. After catapulting, the shock absorber is fully extended as shown in FIG. 4. Under the effect of the return spring 20, the linkage portions 14 and 16 are returned to the in-line position and the catapult bar 10 returns to a substantially horizontal position. In this position, the lug 27 carried by the bar 28 is facing the top tine 25 of the fork 24 which is constrained to rotate with the brace 4, while the bottom tine 26 of the fork 24 is set back slightly from the lug 27. While the landing gear is being raised, the fork 24 pivots relative to the strut 1 together with the brace 4 to which it is fixed, and the top tine 25 of the fork 24 then bears against the lug 27 and drives it. The actuating bar 28 then pivots about the pin 17 and drives the lever 16 so that it occupies the position shown in FIG. 5. Because of the angle between the linkage portions 14 and 16, the catapult bar 10 is completely folded down along the rod 2 of the shock absorber. In its final position, the lug 27 is imprisoned between the tines 25 and 26 of the fork 24 so that when the landing gear is extended, the tine 26 of the fork 24 urges the lug 27 in a direction that causes the catapult bar 10 to be raised, with said action being added to the action of the return spring 20.

Naturally the invention is not limited to the embodiment described, and variant embodiments may be provided without going beyond the scope of the invention. In particular, the single action actuator 18 and the return spring 20 may be replaced by a double action actuator, in which case the actuator is powered to take up a retracted position when the aircraft is in the waiting position, and it is powered to take up an extended position on catapulting.

Similarly, if the structure of the landing gear or the relative positioning of its components does not favor the use of a fork, an additional actuator may be provided for ensuring that the catapult bar is completely folded down when the landing gear is raised.

Further, when the mechanism includes a return spring 20, the in-line position of the catapult bar linkage portions 14 and 16 may be obtained by replacing the abutment 23 carried by the rotary tube 12 by abutments carried by each of the linkage portions 14 and 16 and coming into contact with each other when the link and the lever are in an in-line position.

We claim:

1. A control mechanism for controlling a catapult bar mounted to pivot about a pin carried by a landing gear, the mechanism comprising a crank constrained to rotate with the catapult bar, a catapult bar linkage comprising a link and a lever which are hinged to each other, and having a first end hinged to the crank at a point distant from the pivot pin of the catapult bar, and a second end hinged about a pin carried by the landing gear and distant from the pivot pin of the catapult bar, a return means for returning the link and the lever towards an in-line position including a return spring acting on the link or on the lever, and an abutment for preventing the catapult bar linkage from moving beyond the in-line position, and control means for controlling the relative disposition of the link and the lever; wherein said mechanism is in conjunction with a landing gear including a shock absorber including a strut, a rotary tube mounted to pivot relative to the strut, a rod slidably mounted relative to the rotary tube and to the strut, and a torque linkage having a top arm hinged to the rotary tube and a bottom arm hinged to the rod, wherein the return spring is disposed between one of the arms of the torque linkage and a facing portion of the catapult bar linkage.

2. A control mechanism according to claim 1, wherein the return spring is connected to the bottom arm of the torque linkage on a portion thereof which extends beyond the hinge point between the two arms of the torque linkage.

3. A control mechanism according to claim 1, in conjunction with a retractable landing gear, wherein the control mechanism includes actuator means for actuating the catapult bar towards a folded-down position while the landing gear is being raised.

4. A control mechanism according to claim 3, wherein the actuator means include an actuating member acting on a portion of the catapult bar linkage in order to fold it.

5. A control mechanism according to claim 4, in conjunction with a landing gear comprising a plurality of landing gear components that are moveable relative to one another, wherein the catapult bar linkage is carried by a first component of the landing gear and wherein the actuator member is constrained to rotate with a second component of the landing gear adjacent to the first component of the landing gear, and is disposed to act on a portion of the catapult bar linkage while the landing gear is being raised.

6. A control mechanism according to claim 5, wherein the actuating member comprises a fork cooperating with a lug which is fixed to a portion of the catapult bar linkage.

7. A control mechanism in conjunction with a retractable landing gear for controlling a catapult bar mounted to pivot about a pin carried by a landing gear, the mechanism comprising a crank constrained to rotate with the catapult bar, a catapult bar linkage comprising a link and a lever which are hinged to each other, and having a first end hinged to the crank at a point distant from the pivot pin of the catapult bar, and a second end hinged about a pin carried by the landing gear and distant from the pivot pin of the catapult bar, a return means for returning the link and the lever towards an in-line position including a return spring acting on the link or on the lever, and an abutment for preventing the catapult bar linkage from moving beyond the in-line position, and control means for controlling the relative disposition of the link and the lever, with the control mechanism including an actuator means having an actuating member acting on a portion of the catapult bar linkage for actuating the catapult bar towards a folded-down position while the landing gear is being raised, wherein said landing gear comprises a plurality of landing gear components that are movable relative to one another, wherein the catapult bar linkage is carried by a first component of the landing gear and wherein the actuator member is constrained to rotate with a second component of the landing gear adjacent to the first component of the landing gear, and is disposed to act on a portion of the catapult bar linkage while the landing gear is being raised.

8. A control mechanism according to claim 7, wherein the actuating member comprises a fork cooperating with a lug which is fixed to a portion of the catapult bar linkage.

* * * * *